(12) United States Patent
Doré et al.

(10) Patent No.: US 6,456,064 B1
(45) Date of Patent: Sep. 24, 2002

(54) PIEZO ELECTRIC ACTUATOR HOUSING IN A MAGNETOSTRICTIVE DEVICE

(75) Inventors: Christopher J. Doré, Baton Rouge; Wilbert J. Legendre, Plaquemine, both of LA (US)

(73) Assignee: ProMag, Ltd., Baton Rouge, LA (US)

( * ) Notice: Subject to any disclaimer, the term of this patent is extended or adjusted under 35 U.S.C. 154(b) by 0 days.

(21) Appl. No.: 09/698,668

(22) Filed: Oct. 27, 2000

(51) Int. Cl.⁷ .................................................. G01B 7/14
(52) U.S. Cl. ........................ 324/207.13; 324/207.22; 324/207.24
(58) Field of Search ................ 324/207.13, 207.24, 324/260, 261, 262, 207.22; 73/290 V, 314; 333/148; 364/571.01–571.05; 367/127; 310/311–323.06

(56) References Cited

U.S. PATENT DOCUMENTS

| | | | |
|---|---|---|---|
| 3,423,673 A | 1/1969 | Bailey et al. | 324/207.23 |
| 3,898,555 A | 8/1975 | Tellerman | 324/207.13 |
| 4,071,818 A | 1/1978 | Krisst | 324/207.13 |
| 4,144,559 A | 3/1979 | Okumura et al. | 363/88 |
| 4,238,844 A | 12/1980 | Ueda et al. | 367/117 |
| 4,839,590 A | 6/1989 | Koski et al. | 324/207.21 |
| 4,964,090 A * | 10/1990 | McCarthy | 367/162 |
| 5,017,867 A * | 5/1991 | Dumais et al. | 324/207.13 |
| 5,804,961 A * | 9/1998 | Castillo et al. | 324/207.13 |

* cited by examiner

Primary Examiner—Edward Lefkowitz
Assistant Examiner—Reena Aurora
(74) Attorney, Agent, or Firm—Jones, Walker, Waechter, Poitevent, Carrere & Denegre, L.L.P.

(57) ABSTRACT

An improved piezo electric actuator housing for use in a magnetostrictive device containing a piezo electric actuator and a magnetostrictive, where the improvement is a substantially one-piece container having a slot positioned therein, where the piezo electric actuator and the magnetostrictive wire are partly positioned in the slot, and an elastomeric cushion is positioned in the slot so that the magnetostrictive wire is mechanically coupled to the piezo electric actuator in the slot.

11 Claims, 4 Drawing Sheets

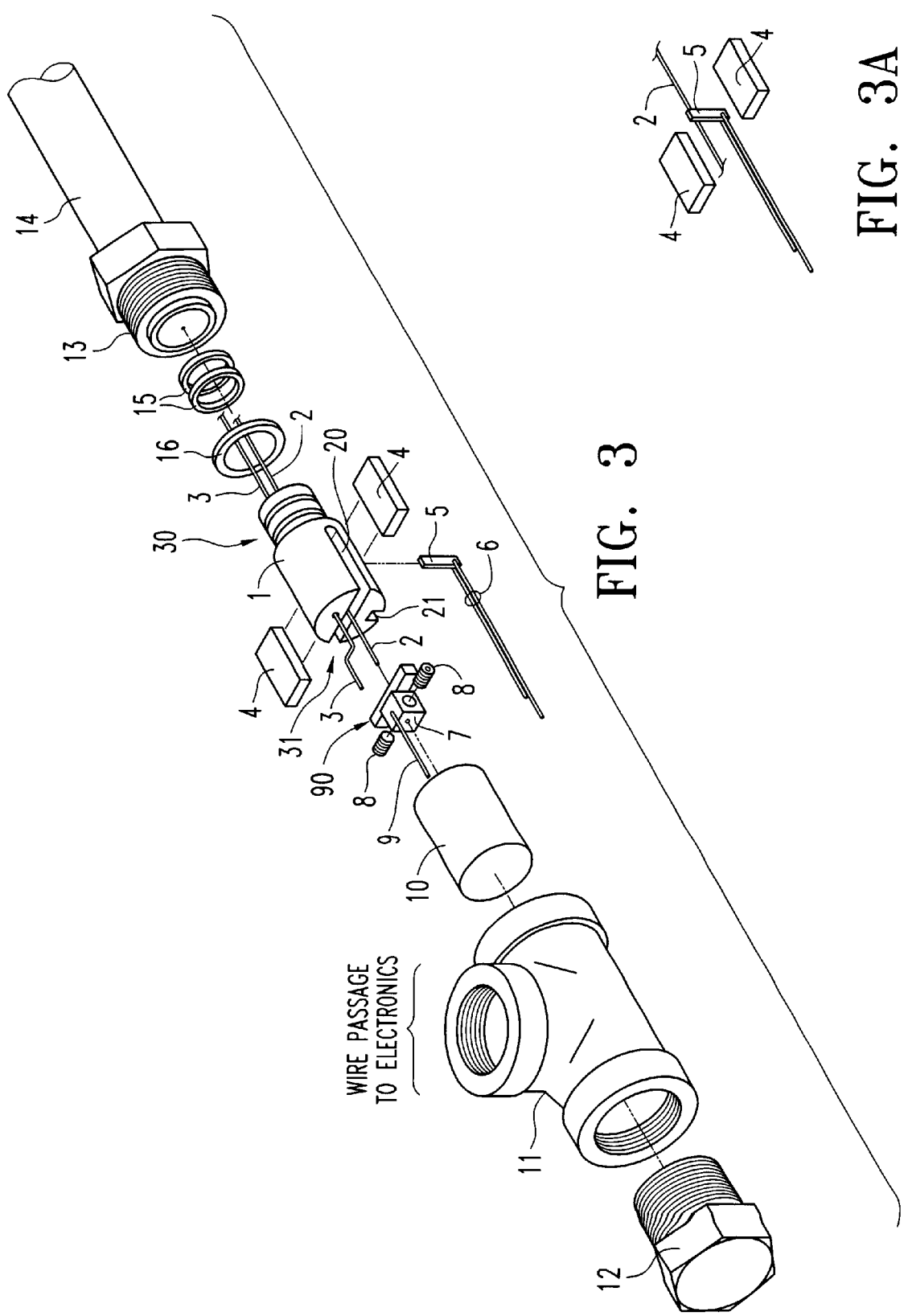

PIEZO ELECTRIC ACTUATOR HOUSING IN A MAGNETOSTRICTIVE DEVICE

FIELD OF INVENTION

This invention relates to linear position transducers of the type comprising a linear magnetostrictive wire into which a signal is induced by applying a torsional strain along the wire and by action of a piezo electric actuator in contact with the wire. In particular, the invention relates to an improved housing for holding the piezo electric actuator in mechanical contact with the wire.

BACKGROUND OF THE INVENTION

It is well know to utilize magnetostrictivity in linear distance or position measuring devices, see, for instance, U.S. Pat. No. Krisst 4,071,818; Chamuel U.S. Pat. No. 4,144,559; Ueda, et al U.S. Pat. No. 4,238,844; Bailey, et al U.S. Pat. No. 3,423,673; Tellerman U.S. Pat. No. 3,898,555 and Koski, et al U.S. Pat. No. 4,839,590; all incorporated by reference. Common to these devices is a straight-line magnetostrictive wire, an actuator for inducing a torsional strain at a given position along the wire (generally a piezo electric crystal), and a magnet, which is displaceable along the wire. The induced torsional strain propagates down the wire and is detected by a magnet, which represents the position of the monitored quantity. The time differential between excitation and detection of the torsional signal determines the distance between the actuator and the magnet, thereby allowing computation of the distance between the actuator and magnet.

A common problem encountered by prior art devices is finding suitable equipment to mechanically link the actuator (generally, a piezoelectric crystal) to the magnetostrictive wire. Some prior art devices welded the wire to the actuator, creating a connection that is easily broken. Koski eliminates the welded contact by providing a removable clamp to hold the MS wire against the piezo crystal, using elastomeric pads between the crystal and clamp. The removable clamp allows one to adjust the compressional force between the piezo crystal and magnetostrictive wire. The Koski structure helps solve the problem with breakage of the connection, but in practice, it is awkward and time inefficient to assemble and can result in inefficient coupling (too little clamping force) or breakage of the piezo crystal (too much clamping force).

SUMMARY OF THE INVENTION

The present invention provides a one-piece actuator housing for the piezo actuator. The housing contains a slot through which the magnetostrictive wire passes. The piezo actuator is also placed in the slot in contact with the magnetostrictive wire. An elastomeric cushion is placed around the wire/actuator, the cushion sized to fill the space in the slot. The housing also has a tail end designed to reside in the outer sleeve of the magnetostrictive device.

OBJECTS OF THE INVENTION

It is an object of the invention to provide a one-piece actuator housing.

It is an object of the invention to provide a structure for providing good mechanical contact between the piezo crystal and the magnetostrictive wire without the need of a clamp.

It is an object of the invention to provide a structure for providing good mechanical contact between the piezo crystal where the contact pressure is not variable or adjustable.

It is an object of the invention to provide a structure for providing good mechanical contact between the piezo crystal where a predetermined contact pressure can be readily established.

It is an object of the invention to provide a one-piece actuator housing of dimensionally stable components to allow the frictionally inserted components to be installed with predictable mechanical results.

It is an object of the invention to provide an actuator housing which can be inserted into one sleeve of the magnetostrictive housing and allowing that housing to be threadably attached to another sleeve.

BRIEF DESCRIPTION OF THE DRAWING

FIG. 3 is an exploded view of the head end of a magnetostrictive device showing a third embodiment of the actuator housing.

DETAILED DESCRIPTION OF THE INVENTION

Figure 1:
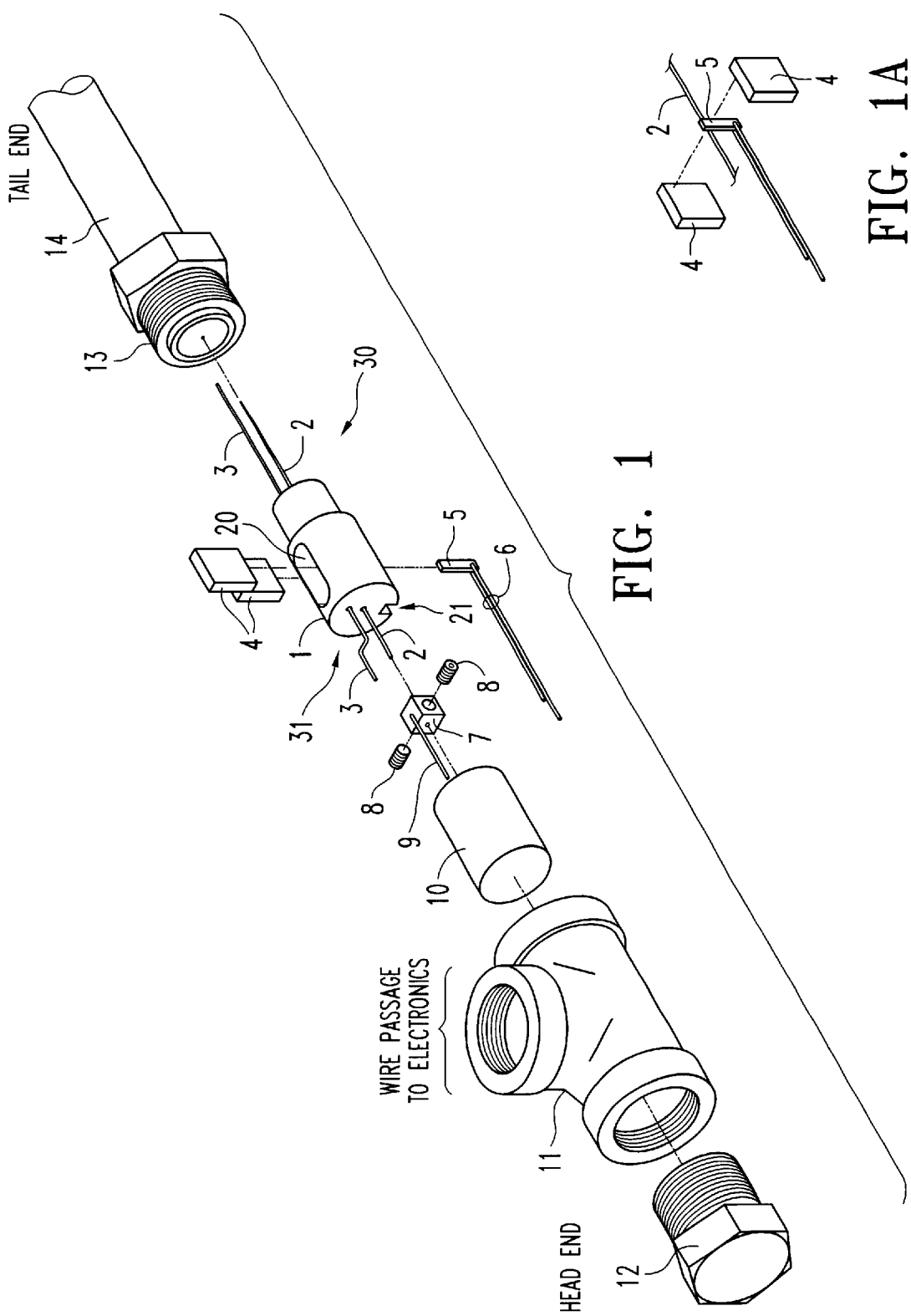
FIG. 1 is an exploded view of the head end of a magnetostrictive device showing one embodiment of the actuator housing.

Shown in FIG. 1 is an exploded view of the head end of a magnetostrictive measuring device. Not shown in detail is the mid section of the device (including the magnet used to detect the torsional signal) and the tail end of the device (where the magnetostrictive wire terminates). Partially shown is mid section outer sleeve of the sensing element housing 14, magnetostrictive wire 2 and return wire 3.

Shown is the piezo electric actuator housing 1. Housing I is a cylinder in cross-section, with a slot 20 in its side. As shown, both return wire 3 and MS wire 2 pass through bores in the rear of the housing, into slot 20, and exit slot 20 through bores in the head end of the housing. It is not necessary that the return wire 3 be present in slot 20. Material for the housing can be an elastomer or thermoplastic material, preferably a material such as Kynar, Teflon, or other plastic or rubber compound that is either moldable or machinable. These materials have good electrical properties and act as a snubbing element against external high frequency vibration. This vibration has been known to fracture the piezo electric actuator. The transfer of external vibration to the magnetostrictive wire is also detrimental to the nature of a magnetostrictive position sensing device, thus the one piece housing constructed of above listed materials, and the non attachment method of assembly serves to introduce a material with high frequency vibration damping coefficient greatly superior to metals and components directly attached to metal parts. The magnetostrictive wire 32 is a nickel/iron alloy; a material known as Nispan C is suitable.

Also shown is wire channel 21, and passageway 22. The electrical wires 6 to the piezo actuator 5 (for activation of the actuator) are placed in wire channel 21, and piezo actuator 5 is inserted in passageway 22. The details of these features are more clearly shown in FIG. 4. The actuator 5 comprises a small rectangular strip of piezoelectric material (generally a crystal) having silver plating on a portion of both sides, leaving unplated and exposed an end portion which provides a seat for the wires 6. The silver plating allows actuation signal wires 6 to be electrically connected to opposite faces of the piezoelectric crystal 5 for actuation (that is, when a voltage is applied across the crystal 5 through wires 6, the crystal expands longitudinally in the direction which is transverse to the slot 20 and MS wire 3). Passageway 22 allows the piezo actuator 5 to be positioned in slot 20 so that actuator 5 contacts the MS wire. It is preferred that the piezo actuator 5 be placed in the tail end of the slot 20.

Also shown are two elastomeric cushions 4. The cushions 4 are inserted into slot 20 trapping the MS wire and actuator 5 between the cushions 4. Obviously, a single folded cushion 4 or "U" shaped cushion could be used. The cushions 4 are sized in relation to the slot so that when inserted in slot 20, the actuator is mechanically linked to MS wire, that is, the wire is tightly held against the piezo actuator so that when the crystal expands longitudinally, it imparts a torsional or twisting force on the MS wire. This arrangement is shown in FIG. 1A. The size of the pads should be sufficient so that under slight compression, the cushions fill the spaces between the MS wire and the piezo actuator.

When the slot size is ¼ inch across, two cushions of thickness 30-durometer rubber, each cushion being ⅛ inch thick, has been found appropriate. This arrangement provides a snug fit when the MS wire and piezo electric actuator 5 are in the slot providing mechanical linkage allowing for the transfer of mechanical motion between the piezo electric actuator 5 and the magnetostrictive wire 2.

The one piece housing 1 as shown (machined or molded) includes all wire passageways, holes, and slots to provide for the easy assembly and insertion of all shown components.

Once the components of the actuator are placed in the housing 1, an insulating sleeve 10 is placed around the housing 1 to prevent shorting of conductors to the outer metal housing 11 and 14, and additionally contains the piezo electric actuator wiring leads 6 in their slot in the piezo electric actuator housing 1.

Also shown in FIG. 1 is the MS wire termination block 7, located on the head end of the housing 1. The termination block 7 has a slot into which the MS wire is inserted, and two setscrews 8 to hold the MS wire fixed to the termination block 7. The termination block 7 allows the MS wire 2 to be drawn in tension and held in tension through the use of the setscrews 8. (The MS wire 2 and return lead 3 extend downward into the mid section and tail end of the magnetostrictive device, through the tubular sensing element housing 14. The MS wire 2 and the return lead 3 are electrically connected together at a welded closure located at the end of the sensing element distal from the actuator housing 1 (not shown). This electrical connection is electrically and mechanically isolated from the welded closure by means of a spring and mounting of non-electrically conductive material. The tail end 30 of the actuator housing 1 is a cylinder smaller in cross-section than the rest of the housing 1. This reduction in size allows the housing to be inserted into the sensing element housing 14 and held in place, providing the second fixed end to apply the proper tension to the MS wire. Additionally, the larger diameter head end of the actuator housing 1 is sized to fit inside an elbow threaded fitting or a "T" shaped threaded fitting 11. A standard ¾ inch stainless "T" shaped fitting is preferred. The threaded fitting allows for easily assembly, disassembly, and is preferred when measuring in hazardous environments. One end of the "T" fitting allows passage of wiring to the electronics module for the magnetostrictive device (not shown).

Figures 2, 2A:
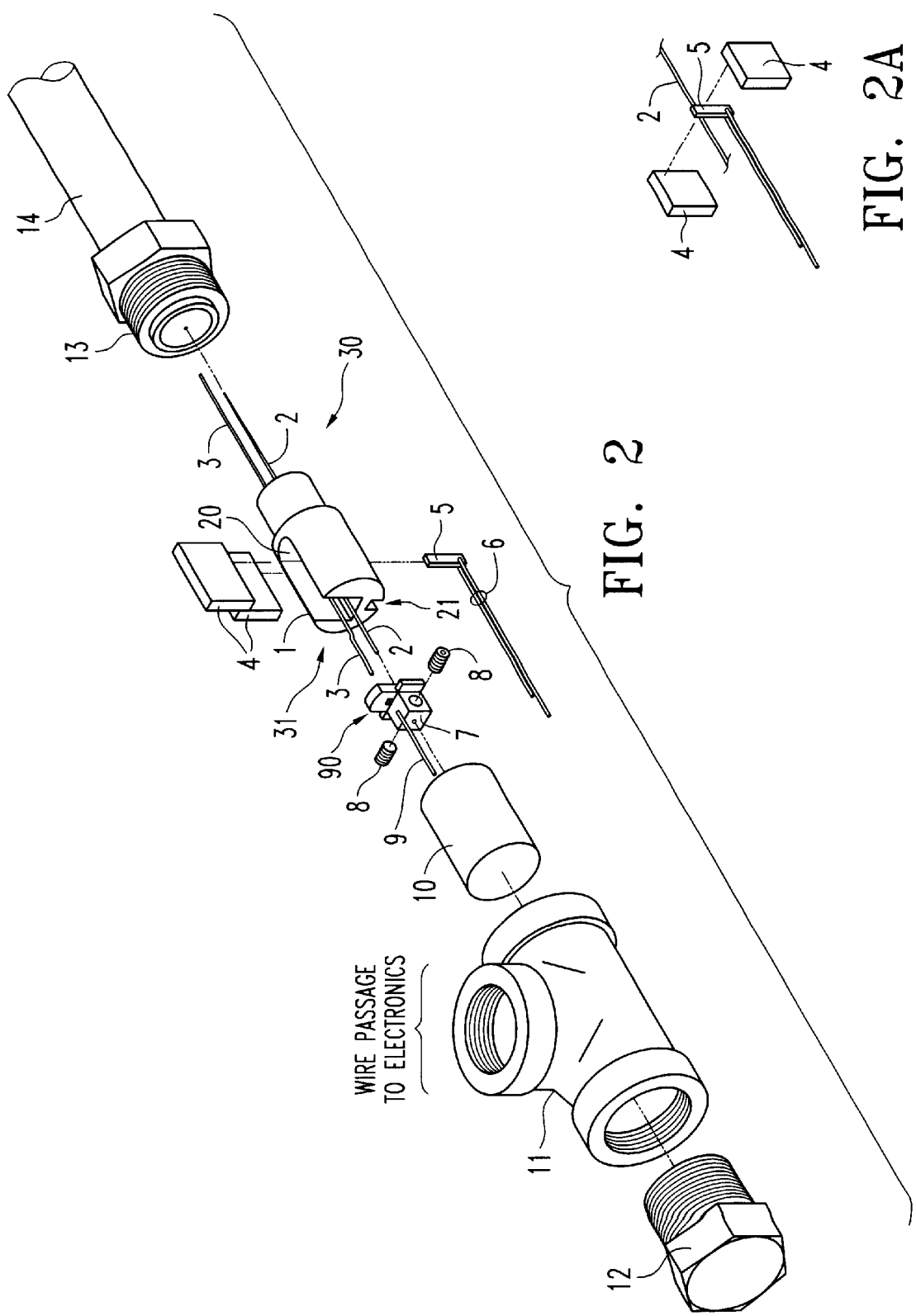
FIG. 2 is an exploded view of the head end of a magnetostrictive device showing another embodiment of the actuator housing.

Shown in FIGS. 2 and 3 are other embodiments of the actuator housing. The primary difference in these embodiments is the position of the slot 20 in the housing 1. In FIG. 3, the slot extends radially across the head end of the housing 1. In FIG. 2, the slot 20 positioned on the longitudinal axis of the housing 1 as in FIG. 1, but the slot now extends through the head end 31 of the housing 1. The slot could extend entirely through the longitudinal axis, from the tail end to the head end of the housing 1. However, this is not preferred, as it is desired to have a stop to prevent the elastomeric cushions 4 from migrating downwardly toward the tail end of the housing 1. Downward movement of the cushion(s) 4 is not desired because it is preferred that the piezo actuator be located, with respect to the cushions 4, near the tail end or tail edge of the cushions 4. If actuator were located at the head end of the slot, there is a potential for the induced torsional signal on the MS wire to be substantially damped or attenuated by the cushions, making detection of the propagating torsional signal more difficult.

Figure 4:
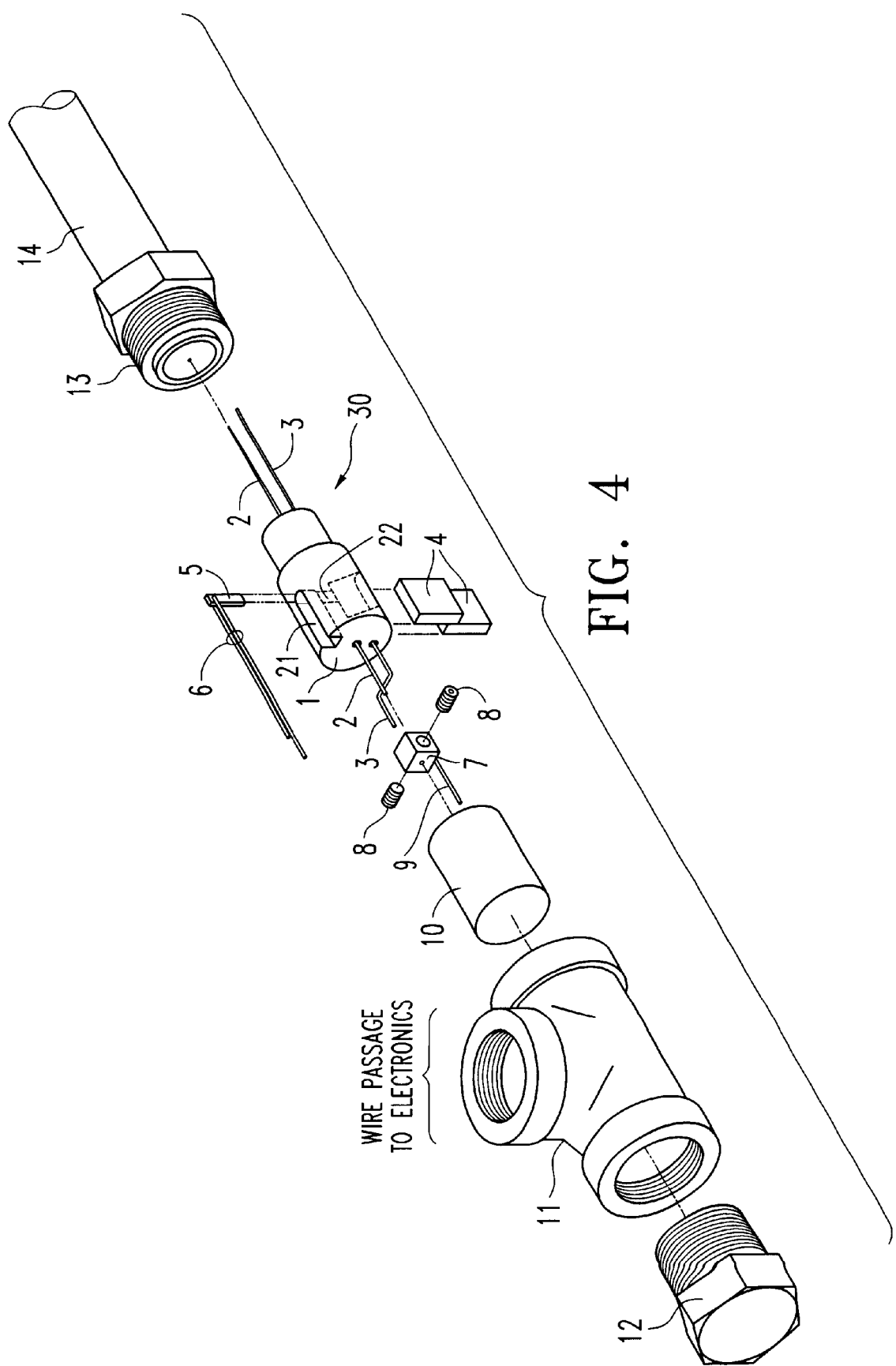
FIG. 4 is an exploded view of the head end of the magnetostrictive device in FIG. 1 from the reverse angle.

In conjunction with the change in the slot's location on the housing, FIGS. 2 and 4 also show modifications in the termination block 7. The termination blocks 7 have been modified on the base section 90 to allow the base section 90 to be inserted into the slot 20. The remainder of the termination block 7 is not insertable into the slot, thus allowing for a firm position on the housing from which tension can be applied and fixed on the MS wire. Additionally, shown in FIG. 3 are optional "O" rings 15 and 16. "O" ring 16 is positioned between the housing and the mid section sleeve 14, which "O" rings 15 ride in channels on tail end of housing 1.

At the head end of the sensing element housing 14 is a threaded fitting 13 that is attached by welding, brazing or other hermetic sealing means. The threaded fittings and threadable outer sleeves of the device (14, 11 and 12) serve as electromagnetic shielding, a weather proof casing, and a hazardous area housing.

This actuator housing allows for a smaller design of the head of the magnetostrictive device, which allows for mounting of the device in closer proximity to the vessel or chamber containing the magnetic float. This closer proximity enables the magnetic field of the float to impart a greater effect on the magnetostrictive wire, thus making the device more accurate. In older designs the housings are larger in diameter and require that the sensing tube be placed at a greater distance from the magnetic field of the float and/or bending of the wire housing tubing at a 90-degree angle from vertical in attempt to accomplish the close proximity. These cause inaccurate results.

Although the present invention has been described in terms of specific embodiments, it is anticipated that alterations and modifications thereof will no doubt become apparent to those skilled in the art which are intended to be included within the scope of the following claims. For instance, the container should be substantially a one piece container. Obviously, the container could be two pieces which can be held together by suitable means, where, when assembled, the slot's size (measured on an axis across the MS wire) is not adjustable or clampable.

We claim:

1. In a magnetostrictive device containing a piezo electric actuator and a magnetostrictive wire, an improved piezo electric actuator housing comprising a one-piece rigid container with an exterior surface and an interior, having a slot extending from said exterior surface into said interior of said container, said piezo electric actuator and said magnetostrictive wire partly positioned in said slot, and an elastomeric cushion positioned in said slot so that said magnetostrictive wire is mechanically coupled to said piezo electric actuator whereby said elastomeric cushion and said piezo electric actuator is maintained partially within said slot without a clamp.

2. A piezo electric actuator housing according to claim 1 further having two elastomeric cushions, said piezo electric actuator and said magnetostrictive wire being partially positioned between said two elastomeric cushions.

3. A piezo electric actuator housing according to claim 1 wherein said container has a longitudinal axis and a transverse axis, and said slot is positioned parallel to said longitudinal axis.

4. A piezo electric actuator housing according to claim 1 wherein said container has a longitudinal axis and a transverse axis, and said slot is positioned parallel to said transverse axis.

5. A piezo electric actuator housing according to claim 1 wherein said slot does not extend through said container.

6. A piezo electric actuator according to claim 1 wherein said slot extends through said container.

7. A piezo electric actuator according to claim 1 wherein said magnetostrictive device further has a terminal block, said magnetostrictive wire fixed to said terminal block, and said terminal block fixedly attached to said container.

8. A piezo electric actuator according to claim 7 wherein said magnetostrictive device further has an outer substantially hollow sleeve composed of a plurality of threadably connected portions, said container having a head end and a tail end, said tail end of said container being smaller in cross section than said head end, said tail end being insertable into one of said threadably connected portions, but said head end not being so insertable.

9. A piezo electric actuator housing according to claim 1 wherein said container further has a opening through said container into said slot, said piezo electric actuator positioned in said slot through said opening.

10. A piezo electric actuator housing according to claim 1 further having a sleeve positioned over said second slot.

11. In a magnetostrictive device containing a piezo electric actuator and a magnetostrictive wire, an improved piezo electric actuator housing comprising a one piece rigid container having a slot positioned therein, said slot having at least one side, said piezo electric actuator and said magnetostrictive wire partly positioned in said slot, and an elastomeric cushion positioned in said slot so that said magnetostrictive wire is mechanically coupled to said piezo electric actuator in said slot whereby said elastomeric cushion and said piezo electric actuator is maintained partially within said slot without a clamp.

* * * * *